Jan. 26, 1971 A. STEVENS 3,557,563
GROUTING NOZZLE
Filed Nov. 24, 1969 3 Sheets-Sheet 1
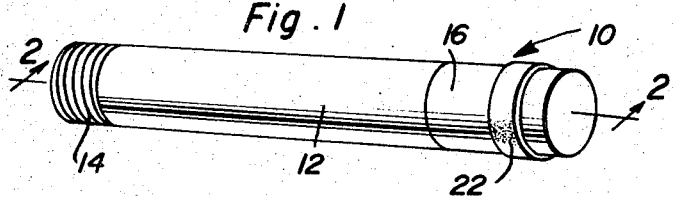
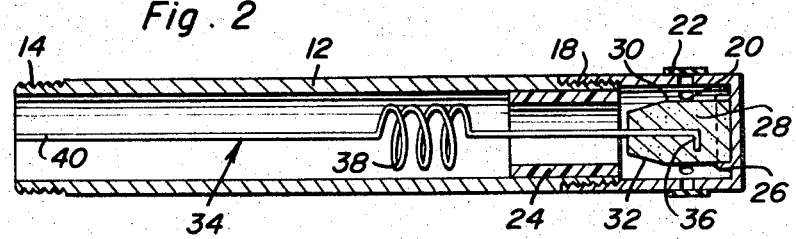
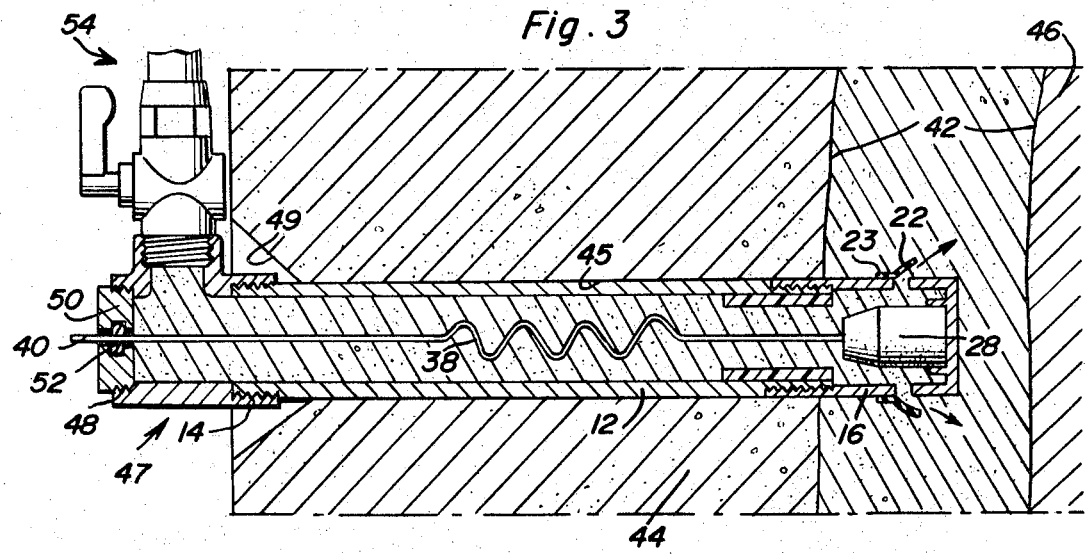
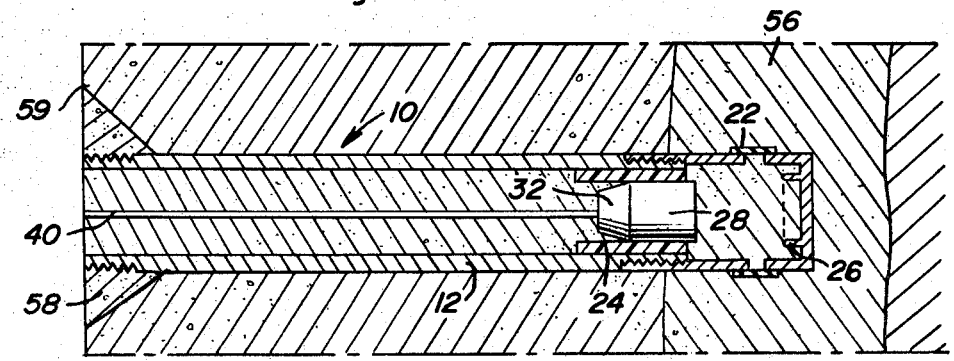
Antoni Stevens
INVENTOR.

Antoni Stevens
INVENTOR.

Jan. 26, 1971          A. STEVENS          3,557,563
GROUTING NOZZLE
Filed Nov. 24, 1969                    3 Sheets-Sheet 3

Antoni Stevens
INVENTOR.

BY *Clarence A. O'Brien*
and *Harvey B. Jacobson*
Attorneys

United States Patent Office 3,557,563
Patented Jan. 26, 1971

3,557,563
GROUTING NOZZLE
Antoni Stevens, 578 Sherman Ave.,
Roselle, N.J. 07203
Continuation-in-part of application Ser. No. 763,591,
Sept. 30, 1968. This application Nov. 24, 1969, Ser.
No. 879,248
Int. Cl. E02b 1/00; E04g 21/02
U.S. Cl. 61—63                                             8 Claims

ABSTRACT OF THE DISCLOSURE

A device for attachment to a grouting nozzle, the device including a tube frictionally connected to a sealing sleeve member. A plug is slidably mounted in the tube and normally retained in spaced relation from the sleeve member to permit the flow of grouting material through the tube to fill a void at the outward end thereof. When such void is filled, the plug is displaced to a second sealing position with respect to the sleeve member for effecting a seal against backflow of grouting material.

The present application is a continuation-in-part of U.S. Ser. No. 763,591, filed Sept. 30, 1968, now Pat. No. 3,492,827.

As mentioned in my previous application, in grouting installations, the void developed between a bored body and an interior lining structure must be filled. Although the grouting nozzle attachment disclosed in my prior application operates quite satisfactorily, it would be advantageous to make available to the public a self-contained plug, seal assembly or device which is simply screwed onto the outlet of the grouting nozzle and which remains in the bored body after filling a void.

The present invention is directed to three different embodiments which achieve flexibility and convenience due to the modular nature of the device which is screwed onto the outlet of the grouting nozzle during the filling of the void, the nozzle being easily separated from the sealing device which is retained in the bored surface. The primary advantage of such a sealing device is the convenience it offers to its users which results in shortened installation periods.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the exterior appearance of a first embodiment of the present invention.

FIG. 2 is a cross-sectional view of the device shown in FIG. 1.

FIG. 3 is a sectional view illustrating the relation of device components during the filling of a void.

FIG. 4 illustrates the final disposition of the device components after the void has been filled.

Figure 5:
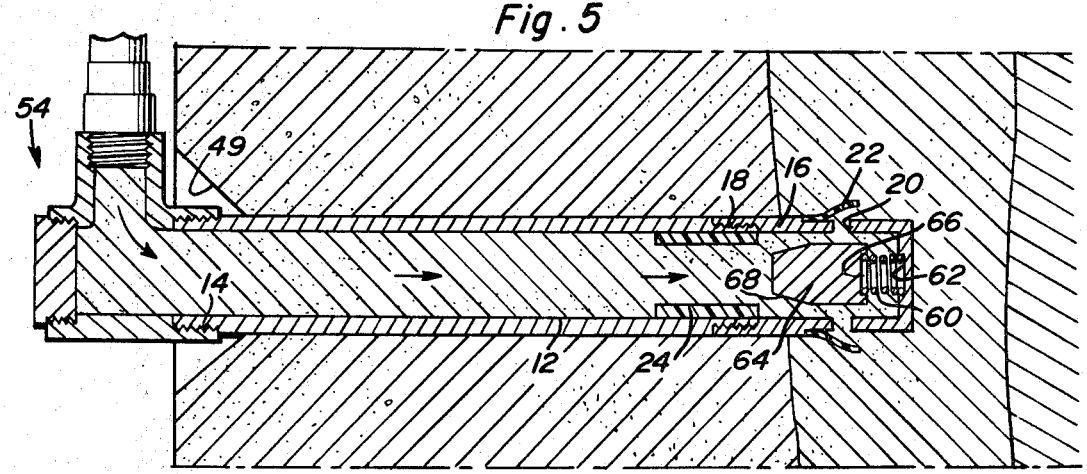
FIG. 5 is a sectional view illustrating the components employed in a second embodiment of the invention, during a void filling operation.

Referring to the drawings and more particularly FIG. 1 thereof, a first embodiment of the present invention is indicated by reference numeral 10 and is seen to include an elongated tubular section 12 having a threaded portion 14 at one end thereof which is adapted for threaded insertion into a grouting nozzle. A cap 16 having an outwardly closed end is threadingly inserted onto the end of the tubular section 12 opposite the threaded end 14. The threaded engagement between the cap and the tubular section is indicated by 18 (FIG. 2). Spaced apertures 20 are formed in the cap 16 as seen in FIG. 2 and are covered by an elastomeric band 22 which serves as a one-way valve. As will be seen in FIG. 3, one end of the band 22 is cemented or otherwise fastened to the cap 16 as indicated by 23. The unattached annular portion of the band 22 serves as a flap to achieve one-way valve action to accommodate flow through the tubular section 12 and outwardly through the holes 20 in the cap 16. A cylindrical sleeve member 24 is inserted in the tubular section 12 and extends to the end of the tubular section which is threadingly engaged with the cap 16. As will be appreciated by viewing FIG. 2, the purpose for the threaded connection between the tubular section and the cap 16 is to allow insertion of sleeve member 24 during the assembly of the device.

The interior surface of the closed end cap 16 has an annular ring 26 formed therein which extends concentrically inwardly of the cap to retain the cylindrical end portion of a plug 28 having a cylindrical portion 30 extending inwardly to a tapering frusto-conical portion 32. When the plug member 28 is secured in the annular ring 26, clearance exists between the cylindrical portion 30 and the spaced holes 20 formed in the cap 16 so that a grouting medium can flow through the tube and outwardly through the holes in the cap as seen in FIG. 3. A strand or wire 34 is disposed in the tubular section 12 and has a first end 36 anchored in the plug member 28. The opposite end of the strand is cut flush with the open tubular section end as indicated by 40. Several coils 38 are formed in an intermediate section of the strand so that the outward end 40 may be expanded by inserting a workman's fingers or a plier into the open end of the tubular section to allow the outward end of the strand to be pulled outwardly as hereinafter explained.

As explained in my previous application, the purpose of the present invention is to permit unidirectional flow of a grouting medium to fill a void 42 developed between a bored rock bed 46 and a confronting surface of concrete or rock. The void is indicated between the tunnel and rock bed boundaries 42.

Referring to FIG. 3, in operation of the device, the attachment 10 is secured at the threaded end 14 to a mating fitting 47 on a grouting nozzle 54. The fitting 47 has a threaded portion 48 into which a plug 50 is fitted. An aperture is formed through the plug 50 and during assembly of the attachment to the grouting nozzle, the outward end 40 of strand 34 is passed through the aperture in the plug 50. An O-ring 52 encircles the strand 34 to prevent leakage therethrough. The bored rock bed includes a countersunk portion 48 to permit the rotation of the fitting 47 therein when filling of the void 42 is completed and the fitting 47 is to be removed.

FIG. 3 illustrates the disposition of the components of the attachment during the flow of grouting material through the attachment and through the holes 20 formed in the cap 16. When the filling of the void has been completed, the outward end 40 of strand 34 is pulled outwardly thereby causing snug engagement between the plug 28 and the sleeve member 24, as seen in FIG. 4, thereby forming a seal between the interior of the cap and the tubular section 12. The frusto-conical portion 32 of the plug aids to guide the plug 28 into position. The increased pressure in the filled void 56 causes downward displacement of the one-way valve 22 thereby preventing backflow of grouting material into the cap. Thus, as will be appreciated, once installed, the attachment 10 includes a double seal, namely, the one-way valve 22 and the sealing plug 28. Once the fitting 47 on grouting nozzle 54 has been removed, the countersunk portion 49 may be filled with material 85 to present a finished surface 59.

FIG. 5 illustrates a second embodiment of the present invention which includes for the main part the structural components of the first-mentioned embodiment shown in FIG. 2 including the tubular portion 12, the cap 16 and the one-way valve 22, also sleeve member 24. The basic departure between the second embodiment and the first discussed embodiment is the inclusion of a coil spring 60 between the interior surface of the closed cap end. An annular recess 62 is formed in the cap surface to receive the spring 60 and a confronting recess 66 is formed in plug 64 to receive an opposite end of the coil spring 60 therein.

Figure 6:
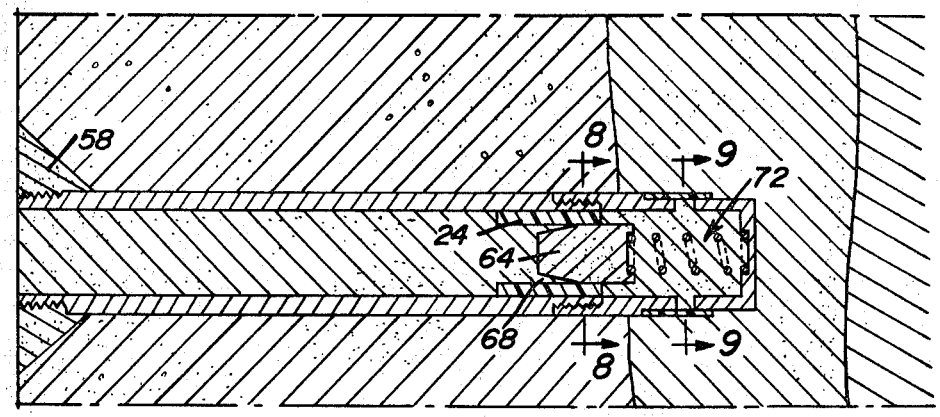
FIG. 6 is a view similar to that of FIG. 5 after the filling of the void has been completed.

Normally, plug 64 is displaced outwardly from the cap end so that contact between the plug 64 and the sleeve member 24 occurs as seen in FIG. 6. However, upon the introduction of pressurized grouting material, as seen in FIG. 5, forces are exerted upon the plug 64 which causes compression of the spring 60 and simultaneous opening of the one-way valve 22 so that grouting material flows through the tubular section 12 and outwardly through the annular holes 20 formed in the cap 16. When the void has been filled, the one-way valve closes due to back pressure and inasmuch as no further pressurized grouting material is supplied, the coil spring 60 forces the plug 64 in snug engagement with the sleeve member 24. As in the first embodiment, the plug 64 includes a tapered frusto-conical section 68 which guides the insertion of the plug 64 into the sleeve member 24 to form a seal. The expansion of the coil spring 60 is indicated by reference numeral 72.

Figure 7:
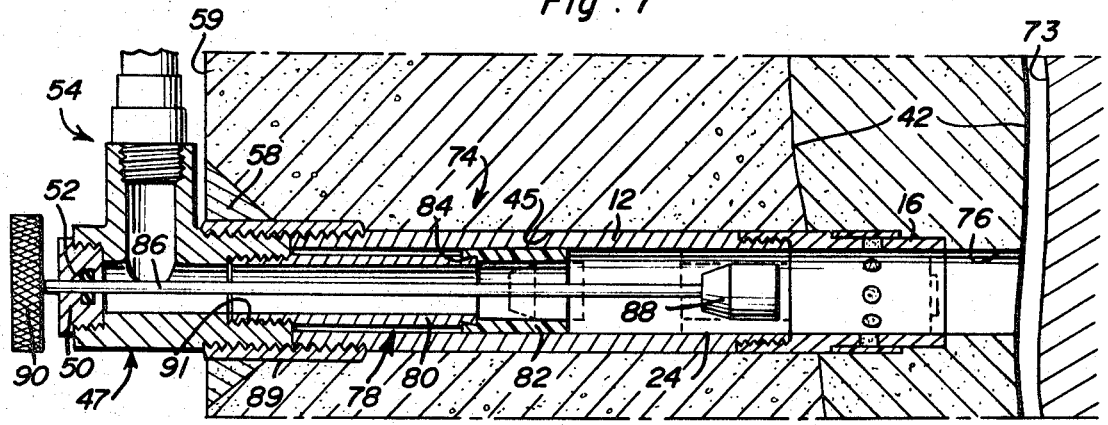
FIG. 7 is a sectional view illustrating a third embodiment of the present invention.
Figure 8:
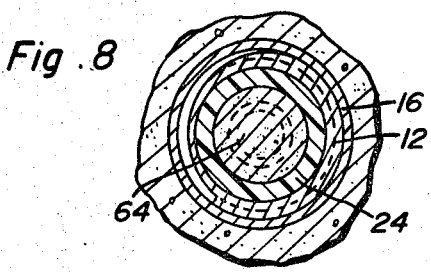
FIG. 8 is a transverse sectional view taken along a plane passing through section line 8—8 of FIG. 6.
Figure 9:
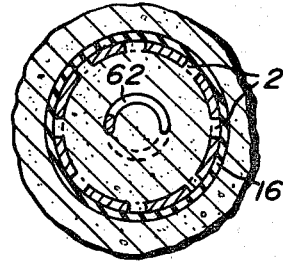
FIG. 9 is a transverse sectional view taken along a plane passing through section line 9—9 of FIG. 6.

The third embodiment of the present invention is pictured in FIG. 7 and is actually an appaartus for refilling a void or fissure which has developed in the previously filled space in which one of the devices of the last two mentioned embodiments has been previously employed. Thus, as will be seen in FIG. 7, a previously existing tubular section 12 resides in an earlier formed bore 45.

A developed fissure 73 is illustrated in FIG. 7 and in order to fill the same, the previously existing interior components within pre-existing tubular section 12 and cap 16 are reamed out and bored through so that communication between the fissure 73 and outward surface 59 is effected. The remnants of the pre-existing attachment are generally indicated by reference numeral 74 and include the tubular section 12 and the attached cap 16. The pre-existing plug and sleeve members have been removed so that a clear passage 76 to the fissure 73 exists. The new attachment to be inserted into the existing tubular section 12 is generally indicated by reference numeral 78 and is seen to include a cylindrical section 80 to which an elastomeric sleeve member is keyed in end-to-end engagement by means of an annular key 84. As will be noted, the cylindrical section 80 is inserted concentrically inwardly of the pre-existing tubular section 12. An actuator rod 86 is axially positioned within the cylindrical member 80 and extends through the sleeve member 82. At the outward end of the actuator 86 is a plug 88 identical in construction to the previously illustrated and described plugs. Because radial clearance is provided between the plug 88 and the encircling interior surface of the tubular section 12, grouting material is free to flow through the device, through the bored passageway 76 into the fissure 73. Upon the sealing of the fissure 73, a knob 90 on the outward end of the actuator 86 is pulled outwardly so that sealing engagement between the plug 88 and the sleeve member 82 is effected thereby preventing backflow through the device. As noted in FIG. 7, the outward end of tubular section 12 is threadably engaged with a fitting 47 via a threaded coupling 89. The threaded outward end of cylindrical member 80 is directly and threadably connected to the fitting as indicated by 91. After the fissure 73 has been filled, and the actuator rod has been pulled outwardly, the plug 88 engages the sleeve member 82 and compressively forces the latter radially outwardly to disengage the annular keying of the sleeve member with the cylindrical section 80. Thus, when such disengagement is effected, the cylindrical section 80 may be withdrawn for subsequent use after removal of the fitting 47.

Figure 10:
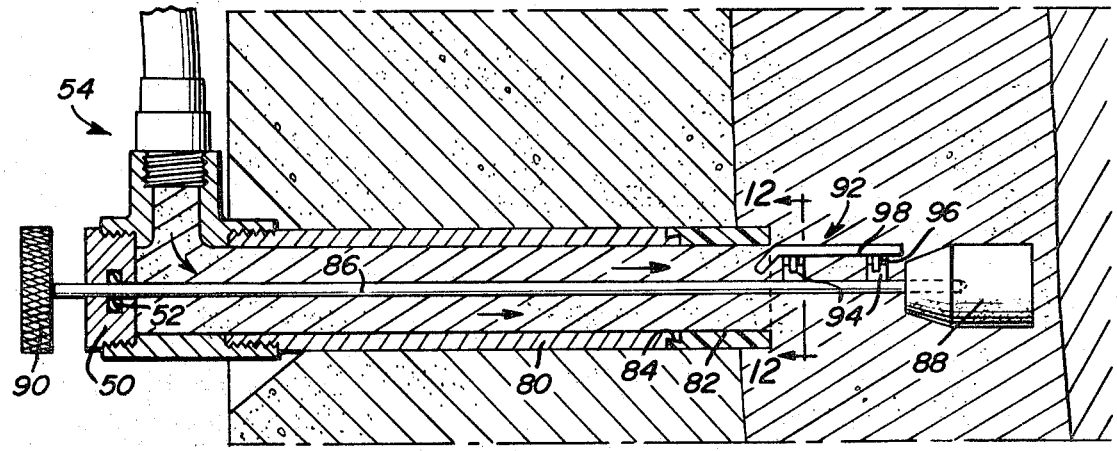
FIG. 10 is a sectional view of a fourth embodiment of the present invention.
Figure 12:
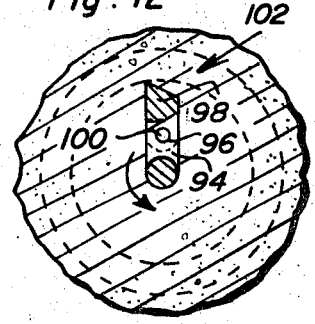
FIG. 12 is a transverse sectional view taken along a plane passing through section line 12—12 of FIG. 10, illustrating the orientation of blade means during erection thereof.
Figure 13:
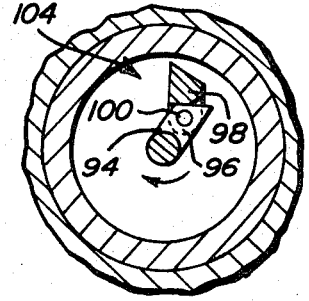
FIG. 13 is a view similar to that of FIG. 12 showing the blade means in a collapsed state.

Attention is directed to FIG. 10 which illustrates a fourth embodiment of the present invention and as will be seen, the components of the device pictured includes the basic components of the third embodiment, namely, a cylindrical section 80 and a frictionally interlocked sleeve member 82 connected at the inward end of the cylindrical section. The actuator rod 86 and attached plug 88 are the same as in the previous embodiment. However, the embodiment shown in FIG. 10 includes means for preventing settling of the grouting material in the void in the space immediately adjacent plug 88. In order to achieve this, blade means 92 mounted to the outward end of the actuator rod 86 is employed. This blade means is collapsible in nature when the actuator rod 86 is turned in a first direction but becomes erect when the actuator rod 86 is rotated in the opposite direction. In particular, the blade means includes two parallel spaced hinges 94 attached to the outward end of the actuator rod 86. Referring to FIG. 12, the hinge will be seen to comprise two pivotally mounted parts connected at a joint 100. The lower member of each hinge is indicated by 96 and the upper hinge member is indicated by 98. As will be noted, a camming interface exists between the upper and lower hinge members 96 and 98. The camming surfaces are so formed to permit erection of the members when the actuator rod 86 is rotated in a first direction as generally indicated by reference numeral 102 in FIG. 12. The confronting camming surfaces of the upper and lower hinge members engage one another and serve as mechanical limit stops. However, as seen in FIG. 13, opposite rotation of the actuator 86 causes disengagement of the camming surfaces thereby causing angular collapse of the upper and lower hinge members as generally indicated by reference numeral 104. When the device is positioned as shown in FIG. 10, the blade means 92 is disposed in the filled void and can be stirred by rotating the actuator rod 86 in the direction indicated in FIG. 12. However, when withdrawal of plug 88 is desired, the actuator rod 86 is rotated in an opposite direction as seen in FIG. 13 thereby causing the collapse of the blade means 92 which further enables withdrawal of the actuator rod 86 and the attached plug 88 inwardly for engagement between the plug 88 and the sleeve member 82. When snug engagement occurs between the plug and sleeve member, the sleeve member is expanded outwardly thereby causing release of keying action. If the dimensions of the sleeve member and the plug are adjusted, withdrawal and salvage of the cylindrical section 80 may be possible. However, as shown in FIG. 11, the dimensions are so chosen that disengagement will not occur and instead, the cylindrical section 12 remains in the receiving bore.

Figure 11:
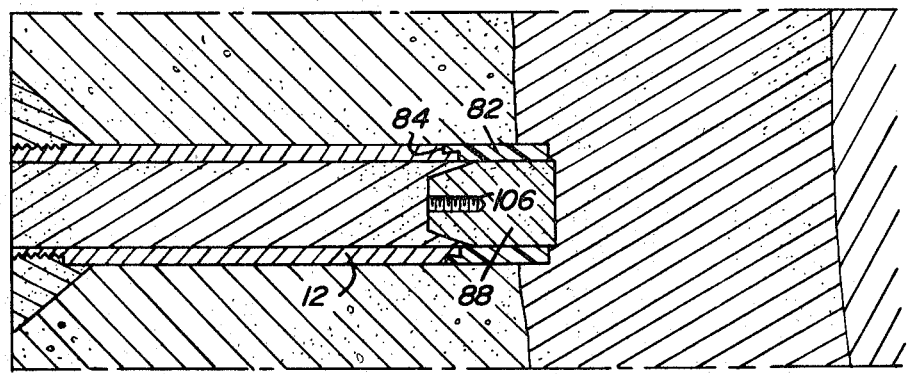
FIG. 11 is a sectional view illustrating the final appearance of the component portions of the fourth embodiment after a void has been completed.

Continuing with reference to FIG. 11, it will be noted that the plug engaging end of the actuator rod 86 is to be threaded so as to engage a threaded bore 106 formed in the plug 88. Thus, when the plug is pulled into engaging position with the sleeve member 82, the actuator rod may be disengaged from the plug 88 by unscrewing the rod.

Although the blade means 92 are discussed relative to the structure of FIG. 10, it should be appreciated that it may be used with any suitable actuator rod nozzle device including the invention disclosed in copending application Ser. No. 763,591.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A removable grouting nozzle attachment for sealing a bore comprising an elongated tube, a hollow closed cap fitted on one end of the tube, one way valve means connected to the cap to permit exiting flow therethrough, a sealing sleeve member interiorly disposed between the tube and the cap, a generally frusto-conical plug normally located in the cap, in spaced relation from the valve means, expandable actuator means anchored in the plug and extending along the length of the tube, the one-way valve means being closable upon the termination of mass flow through the attachment, whereupon the actuator is pulled into engagement with the sleeve member to cause sealing between the cap and the tube.

2. The structure set forth in claim 1 wherein the actuator means comprises a strand having a plurality of coils along an intermediate portion thereof, the strand having an outwardly disposed end which coincides with the outward end of the elongated tube, the coils permitting grasping of the strand and outward pulling thereof.

3. The device set forth in claim 1 wherein the interior surface of the cap includes an annular ring formed therein to retain a confronting portion of the plug.

4. A removable grouting nozzle attachment for sealing a bore comprising an elongated tube, a hollow closed cap fitted on one end of the tube, one-way valve means connected to the cap to permit exiting flow therethrough, a sealing sleeve member interiorly disposed between the tube and the cap, a generally frusto-conical plug normally located in the cap, in spaced relation from the valve means, flexibly resilient means connected between the plug and the cap for permitting automatic displacement of the plug from the sleeve member during pressurized mass flow through the attachment, the one-way valve means being closable upon termination of mass flow whereupon the flexibly resilient means causes sealing engagement of the plug in the sleeve member to cause sealing between the cap and the tube.

5. In an apparatus for refilling a void, the void having been previously filled and sealed by a sealing device, the device being bored out to provide communicating access with the void, the resultant bore further allowing introduction of the apparatus comprising an elongated tube, a hollow sleeve member releasably secured to the tube and insertable within the bore for peripheral sealing engagement with the bore, actuator means disposed in the tube, a plug member connected to an outward end of the actuator means in normally spaced relation to the tube, the plug member being slidable in response to displacement of the actuator means in order to effect closure between the plug and the sleeve member, grouting fluid passing through the tube for final deposition in the void to be refilled.

6. The device set forth in claim 5 wherein the dimensions of the plug member and the sleeve member are designed to effect snug engagement therebetween expanding the sleeve member outwardly resulting in the release of the sleeve member from the tube thereby permitting withdrawal of the tube from a receiving bore.

7. A device for sealing a bore, the device being attachable to a grouting nozzle and comprising an elongated tube, a sealing sleeve member frictionally engaging the tube, a plug, slidably mounted in the tube and residing in a first position axially spaced from the sleeve member to permit the flow of a mass from the nozzle therethrough, an actuator connected to the plug for displacing it to a second sealing position with respect to the sleeve member for effecting closure between the plug and the sleeve member thereby permitting mass backflow through the bore, the actuator including collapsible rotatable blade means for preventing setting of the mass, the blade means being erect when rotated in the mass in a first direction, the blade means collapsing when turned in an opposite direction thereby permitting displacement of the blade means to the second position.

8. The structure set forth in claim 7 wherein the blade means comprises at least one hinge attached to the actuator, the hinge having camming surfaces formed at the hinge joint to serve as a mechanical stop when the blade means encounters viscous forces as it is turned in the first erecting direction, and a blade member connected to the outward end of the hinge to encounter the viscous forces and prevent setting of the mass.

References Cited

UNITED STATES PATENTS

| | | | |
|---|---|---|---|
| 1,478,865 | 12/1923 | Weber | 61—35UX |
| 1,841,180 | 1/1932 | Harding | 18—3.5UX |
| 1,883,196 | 10/1932 | Wertz | 61—35UX |
| 2,095,187 | 10/1937 | Grandbouche | 52—744X |
| 2,313,110 | 3/1943 | Wertz | 61—35X |
| 2,187,324 | 1/1940 | Many | 52—744UX |
| 3,243,933 | 4/1966 | Wilkie et al. | 52—749 |
| 3,419,647 | 12/1968 | Hight et al. | 264—36X |
| 3,492,381 | 1/1970 | Rhyne | 264—36X |
| 3,492,827 | 2/1970 | Stevens | 61—63 |

FOREIGN PATENTS

| | | | |
|---|---|---|---|
| 261,652 | 12/1928 | Italy | 61—63 |

DENNIS L. TAYLOR, Primary Examiner

U.S. Cl. X.R.

18—3.5; 52—744; 264—30, 36